(12) United States Patent
Dwarakanath et al.

(10) Patent No.: US 10,851,629 B2
(45) Date of Patent: Dec. 1, 2020

(54) ENHANCED OIL RECOVERY COMPOSITIONS AND METHODS THEREOF

(71) Applicant: Chevron U.S.A. Inc., San Ramon, CA (US)

(72) Inventors: Varadarajan Dwarakanath, Houston, TX (US); Robert G. Shong, Houston, TX (US); Gregory A. Winslow, Houston, TX (US); Taimur Malik, Houston, TX (US); Marlon Solano, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/421,909

(22) Filed: May 24, 2019

(65) Prior Publication Data

US 2019/0345800 A1    Nov. 14, 2019

Related U.S. Application Data

(63) Continuation of application No. 15/511,563, filed on Mar. 15, 2017, now Pat. No. 10,337,303.
(Continued)

(51) Int. Cl.
*E21B 43/16*    (2006.01)
*C09K 8/58*    (2006.01)
(Continued)

(52) U.S. Cl.
CPC ............ *E21B 43/162* (2013.01); *C09K 8/58* (2013.01); *C09K 8/584* (2013.01); *C09K 8/588* (2013.01);
(Continued)

(58) Field of Classification Search
None
See application file for complete search history.

(56) References Cited

U.S. PATENT DOCUMENTS 509,989 A     12/1893  Egbert
3,220,473 A   11/1965  Holm
(Continued)

FOREIGN PATENT DOCUMENTS

WO     2014055158 A1      4/2014
WO     WO-2015157156 A1 * 10/2015

OTHER PUBLICATIONS

Bauduin, P., et al; "Temperature Dependence of Industrial Propylene Glycol Alkyl Ether / Water Mixtures"; Journal of Molecular Liquids, (2004), vol. 115, pp. 23-28.
(Continued)

*Primary Examiner* — Angela M DiTrani Leff

(57) ABSTRACT

Additional oil recovery is obtained from a reservoir with a composition comprising at least a coupling solvent typically employed in waterborne coating compositions. Provided herein are embodiments of methods of recovering hydrocarbons using at least one coupling solvent, such as an oxygenated coupling solvent. The coupling solvent increases the mutual solubility with water at the injection temperature to facilitate the mixing and injection, particularly with an optional co-solvent. The coupling solvent helps mitigate formation plugging and improve performance when injected into a formation, as the solvent mixture moves from being miscible in the injection field water to being miscible in the reservoir oil, mobilizing the reservoir oil to increase oil recovery.

20 Claims, 5 Drawing Sheets

Related U.S. Application Data

(60) Provisional application No. 62/213,495, filed on Sep. 2, 2015.

(51) Int. Cl.
*C09K 8/584* (2006.01)
*C09K 8/588* (2006.01)
*C08L 5/00* (2006.01)
*C08L 81/08* (2006.01)

(52) U.S. Cl.
CPC ............... *C08L 5/00* (2013.01); *C08L 81/08* (2013.01); *C08L 2201/54* (2013.01)

(56) References Cited

U.S. PATENT DOCUMENTS

| | | | |
|---|---|---|---|
| 3,446,282 A | 5/1969 | Cooke, Jr. | |
| 4,457,373 A | 7/1984 | Balzer et al. | |
| 4,582,138 A * | 4/1986 | Balzer ................... | C09K 8/584 166/270.1 |
| 4,966,235 A | 10/1990 | Gregoli et al. | |
| 5,306,350 A | 4/1994 | Hoy et al. | |
| 5,527,486 A | 6/1996 | De Guertechin | |
| 5,547,022 A | 8/1996 | Juprasert et al. | |
| 5,690,174 A | 11/1997 | Chapman et al. | |
| 5,753,738 A | 5/1998 | Chapman et al. | |
| 6,022,833 A | 2/2000 | Mueller et al. | |
| 6,148,913 A | 11/2000 | Collins | |
| 6,225,263 B1 * | 5/2001 | Collins ................... | C09K 8/58 507/261 |
| 6,242,517 B1 | 6/2001 | Christensen et al. | |
| 6,581,687 B2 | 6/2003 | Collins et al. | |
| 6,939,832 B2 | 9/2005 | Collins | |
| 7,417,010 B2 | 8/2008 | Collins | |
| 7,419,938 B2 | 9/2008 | Collins | |
| 2009/0203557 A1 | 8/2009 | Barnes et al. | |
| 2012/0097389 A1 | 4/2012 | Dwarakanath et al. | |
| 2013/0196885 A1 | 8/2013 | Pabalan et al. | |
| 2015/0167437 A1 | 6/2015 | Dawson | |
| 2018/0230788 A1 | 8/2018 | Dwarakanath et al. | |

OTHER PUBLICATIONS

Cox, Henry L., et al.; "Reciprocal Solubility of the Normal Propyl Ethers of 1,2-Propylene Glycol and Water. Closed Solubility Curves II"; vol. 49, (Apr. 1927), pp. 1080-1083.

"Dow Oil & Gas Offerings for EOR Operations, Multi-Functional Chemicals and Materials for Enhanced Performance"; Dow Oil & Gas, Form No. 812-00007-0908; pp. 1-2.

"Miscibility Characteristics of Glycol Ether/Water Mixtures for Waterborne Coatings"; Phase Equilibria of Eastman EB Solvent/Water; Title pages (2) and pp. 1-7.

Nassar, Vivian L., et al.; "Solubility of Hydrocarbons in Physical Solvents"; Bryan Research & Engineering, Inc.; (2000), pp. 1-15.

Randall, T.E., et al.; "Recent Developments in Slim Tube Testing for Hydrocarbon-Miscible Flood (HCMF) Solvent Design"; Enhanced Oil Recovery, Nov.-Dec. 1988, vol. 27, No. 6, pp. 33-44.

Wang, Dongmei, et al.; "Enhanced Oil Recovery from the Bakken Shale using Surfactant Imbibition Coupled with Gravity Drainage—09123-09"; RPSEA Final Report (09123.11.Final); pp. I-IX and pp. 1-66.

International Search Report, dated Nov. 11, 2016, during the prosecution of International Application No. PCT/US2016/050057.

Written Opinion, dated Nov. 11, 2016, during the prosecution of International Application No. PCT/US2016/050057.

* cited by examiner

ENHANCED OIL RECOVERY COMPOSITIONS AND METHODS THEREOF

CROSS REFERENCES TO RELATED APPLICATIONS

The present application claims priority and benefit as a continuation patent application from U.S. application Ser. No. 15/511,563, filed on Mar. 15, 2017, which is incorporated by reference in its entirety. This application claims benefit under 35 USC 119 of U.S. Provisional Patent Application No. 62/213,495 with a filing date of Sep. 2, 2015, which is incorporated herein by reference in its entirety.

TECHNICAL FIELD

The present disclosure generally relates to compositions for use in enhanced oil recovery, and systems and methods thereof.

BACKGROUND

Reservoir systems, such as petroleum reservoirs, typically contain fluids such as water and a mixture of hydrocarbons such as oil and gas. To remove ("produce") the hydrocarbons from the reservoir, different mechanisms can be utilized such as primary, secondary or tertiary processes. In a primary recovery process, hydrocarbons are displaced from a reservoir through the high natural differential pressure between the reservoir and the bottom-hole pressure within a wellbore. In order to increase the production life of the reservoir, secondary or tertiary recovery processes can be used ("enhanced oil recovery" or EOR). Secondary recovery processes include water or gas well injection, while tertiary methods are based on injecting additional chemical compounds into the well, such as surfactants/solvents and polymers, for additional recovery. The surfactants/solvents free oil trapped in the pores of the reservoir rock. In an enhanced oil recovery process, some of the chemical compounds that are injected will remain underground, and some of will be recovered with the oil that is produced.

There is a need for improved compositions, preparations, and methods for convenient and efficient EOR applications, particularly in high temperature reservoirs. There is also a need for methods for recycling/reuse of produced water and chemical compounds. The improved method employs coupling solvents commonly used in waterborne coating applications to increase oil recovery by taking advantage of their miscible and immiscible phase behavior in water as a function of temperature.

SUMMARY

In one aspect, the invention relates recovering hydrocarbons using at least one coupling solvent, such as an oxygenated coupling solvent. In one embodiment, the method to recover hydrocarbons from a reservoir, where the reservoir has a reservoir temperature, comprises: providing an oxygenated coupling solvent, where the oxygenated coupling solvent is characterized as having water immiscibility at the reservoir temperature; providing a water for injecting into the reservoir; forming an aqueous mixture of the water and the oxygenated coupling solvent; injecting the aqueous mixture into the reservoir to displace the hydrocarbons with the aqueous mixture, where at least a portion of the oxygenated coupling solvent is water immiscible at the reservoir temperature and therefore miscible with the hydrocarbons at the reservoir temperature for driving the hydrocarbons toward a production well; recovering produced water from the production well, where the produced water contains the displaced hydrocarbons and at least a portion of the injected aqueous mixture; and separating the recovered produced water at a temperature that is below the reservoir temperature, where at least a portion of the oxygenated coupling solvent in the recovered produced water remains water miscible in the recovered produced water for subsequent injection into a reservoir.

In one embodiment, a method for selecting additive solvents for use in recovering hydrocarbons in a waterflooding operation comprises: obtaining characteristics of a reservoir, including the reservoir temperature; obtaining characteristics of a brine from the reservoir including salinity, pH, and polar organic solvent contents; identifying a oxygenated coupling solvent; using a first phase equilibria diagram of phases observed from an aqueous mixture of brine and the identified oxygenated coupling solvent; identifying a co-solvent for mixing into the aqueous mixture; using a second phase equilibria diagram of phases observed from an aqueous mixture of brine, the identified oxygenated coupling solvent, and the identified co-solvent; forming an injection stream with the identified oxygenated coupling solvent and the identified co-solvent for injection into the reservoir at a desired concentration of oxygenated coupling solvent and co-solvent mixture; and injecting the injection stream into the reservoir to displace hydrocarbons in the reservoir, where at least a portion of the oxygenated coupling solvent is water immiscible at the reservoir temperature and therefore miscible with the hydrocarbons at the reservoir temperature for driving the hydrocarbons toward a production well.

DETAILED DESCRIPTION

Figure 1:
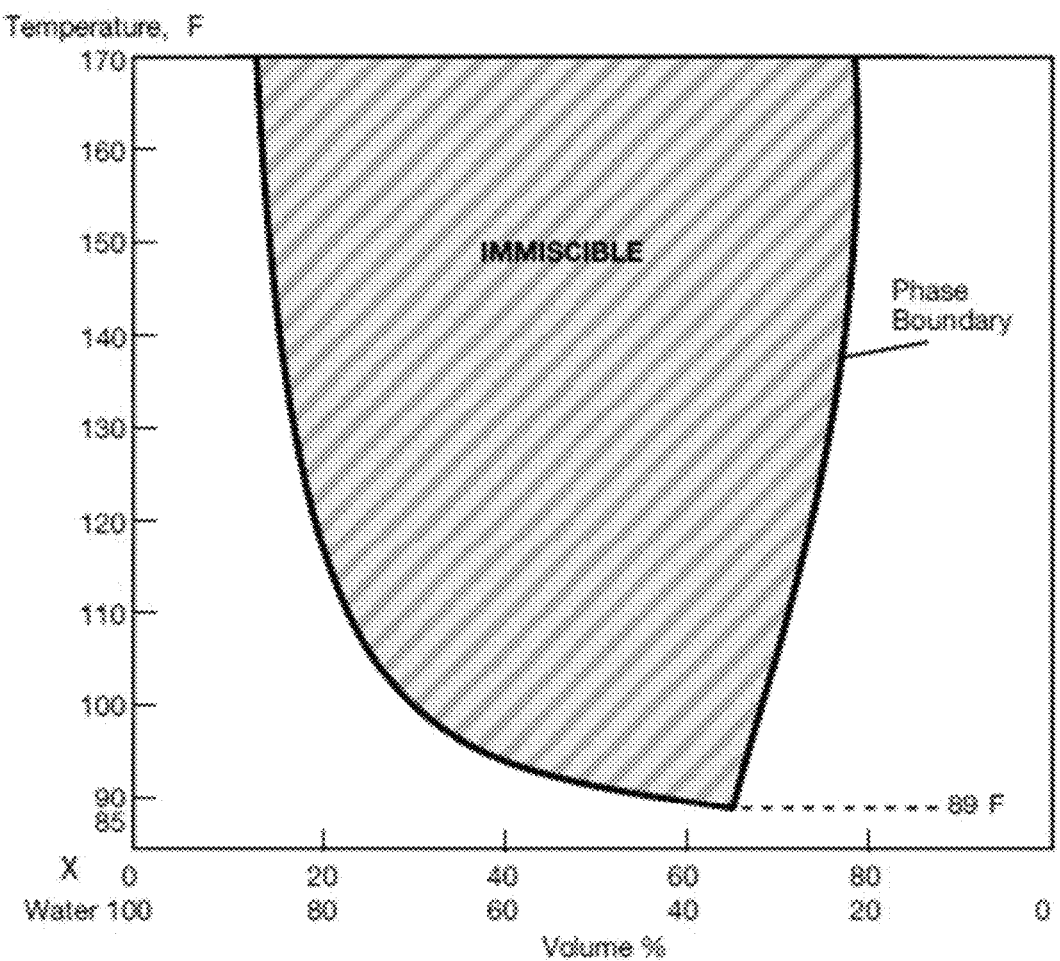
FIG. 1 is a representative phase diagram showing the phase equilibria of a coupling solvent X as a function of temperature and concentration in water.

The following terms will be used throughout the specification and will have the following meanings unless otherwise indicated.

"A" or "an" means "at least one" or "one or more" unless otherwise indicated. As used herein "multi-" or "plurality" refers to 2 or more.

"Comprise", "have", "include" and "contain" (and their variants) are open-ended linking verbs and allow the addition of other elements when used in a claim.

"Consisting of" is closed, and excludes all additional elements.

"Consisting essentially of" excludes additional material elements, but allows the inclusions of non-material elements that do not substantially change the nature of the invention.

"Effective amount," refers to an amount sufficient to effect a measurable difference over not including the amount. For example, an effective amount of solvent in an injection stream would increase oil recovery over only using the equivalent injection stream without the solvent.

"Equal" refers to equal values or values within the standard of error of measuring such values. "Substantially equal" refers to an amount that is within 3% of the value recited.

"Hydrocarbons" or "hydrocarbonaceous" or "petroleum" or "crudes" or "crude oil" or "oil" may be used interchangeably to refer to carbonaceous material originating from subterranean sources as well as synthetic hydrocarbon products, including organic liquids or gases, kerogen, bitumen, crude oil, natural gas or from biological processes, that is principally hydrogen and carbon, with significantly smaller amounts (if any) of heteroatoms such as nitrogen, oxygen and sulfur, and, in some cases, also containing small amounts of metals. Crude oil (e.g., liquid petroleum) and natural gas (e.g., gaseous petroleum) are both hydrocarbons.

"Reservoir," "formation," and the like refer to practically any rock matrix that includes hydrocarbons. In addition to the hydrocarbons and the rock matrix, the reservoir may include pore space, water (e.g., formation water or connate water), etc. A solvent mixture may be injected into the reservoir (via at least one injection well) to produce the hydrocarbons in the reservoir (via at least one production well). In some embodiments, the reservoir may be divided into hydrocarbon bearing regions (or hydrocarbon bearing zones), and the hydrocarbons may be produced from those regions of the reservoir (i.e., producing regions of the reservoir).

"Well" and "wellbore" are used interchangeably to denote a borehole extending from the earth surface to a subterranean formation and at least partially in fluid communication with a reservoir. Depending on the embodiment, a wellbore can be used for injection, production, or both. The wellbore may include casing, liner, tubing, other items, or any combination thereof. The wellbore may include an open hole portion or uncased portion. The wellbore may be vertical, inclined, horizontal, combination trajectories, etc. The wellbore may include any completion hardware that is not discussed separately. The term wellbore is not limited to any structure and configuration described herein. A "production well" enables the removal of fluids from the reservoir to the surface and an "injection well" enables the placement of fluid into the reservoir from the surface.

"Pore volume" or "PV" fraction as used herein refers to the total volume of pore space in the oil reservoir that is contemplated in a reservoir sweep (e.g., contacted pore space at alkali-surfactant-polymer (ASP), surfactant-polymer (SP), alkali-polymer (AP), and/or polymer drive (PD) mobility ratio).

"Slug" refers to an amount of a composition that is to be injected into a subterranean reservoir.

"Miscible," refers to forming a homogeneous mixture when two or more liquids are mixed together.

"Immiscible" refers to NOT forming a homogeneous mixture when two or more liquids are mixed together.

Immiscible liquids that are shaken together eventually separate into layers or phases, e.g., an oil phase or layer and a water phase or layer.

"Phase inversion temperature" ("PIT") of a water/oil mixture refers to the temperature wherein the oil/water ("o/w") emulsion changes over into a water/oil ("w/o") emulsion or vice versa. The PIT can be determined by measuring conductivity. The temperature at which electric conductivity has reached the mean value between the upper o/w and lower w/o level is recorded as the PIT.

"Coupling solvent" refers to an organic compound which enables the presence of a single phase in a water-containing composition such that the components of the composition, namely, the coupling solvent, the water, and another solvent (i.e., another organic compound as co-solvent) all are at least partially miscible with one another.

Compatibility of a solvent in water can be improved by the addition of a coupling solvent. The coupling solvent is also characterized as being able to bind to hydrophobic as well as hydrophilic components depending on the temperature of the composition. The coupling solvent can be an oxygenated coupling solvent. For example, the oxygenated coupling solvent comprises ketones, esters, ethers, glycol ethers, glycol ether esters, or any combination thereof.

"Mixture" is used broadly herein and refers to practically any combination of items. For example, a mixture of water and a coupling solvent may include practically any combination of the water and the coupling solvent, and in some embodiments, the mixture of the water and the coupling solvent may be a solution as defined in the chemical arts.

"Reservoir temperature" and "reservoir operating temperature" are used interchangeably, and the terms refer to the temperature of a reservoir. In some embodiments, the reservoir may be divided into hydrocarbon bearing regions (or hydrocarbon bearing zones), and the hydrocarbons may be produced from those regions of the reservoir (i.e., producing regions of the reservoir). Thus, the "reservoir temperature" or "reservoir operating temperature" may be the temperature of a producing region of the reservoir. The temperature may be determined using at least one downhole temperature sensor. In some embodiments, the temperature may be determined in real-time or near real time. In some embodiments, the reservoir temperature may be an average of various temperature readings. Various techniques are known to those of ordinary skill in the art for determining the temperature of a reservoir.

"Lower Critical Solution Temperature" refers to the minimum point of a miscibility boundary curve (phase diagram), or the temperature at which immiscibility first occurs for an organic solvent/water composition, or the critical temperature below which the components of a mixture (of organic solvent/water) are miscible for all compositions.

"Brine" refers to practically any liquid that may be injected into a reservoir. The brine may be surface water, water recovered from a production wellbore, sea water, produced formation brine, formation brine, fresh water, produced water, water, saltwater, synthetic brine, synthetic seawater brine, or any combination thereof. In some embodiments, brines may include, but are not necessarily limited to, heavy brines, monovalent brines, divalent brines, and trivalent brines that comprise soluble salts like sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, any derivative thereof, or any combination thereof.

Coupling solvents have been used in water-based coatings, added to paint formulations in various amounts to optimize dispersants, to solubilize water-reducible polymers, to function as coalescents, etc. Coupling solvents are characterized as forming regions of equilibria from miscible to immiscible at different temperatures. As illustrated in FIG. 1, a mixture of a coupling solvent in water would be miscible at one temperature (as in waterborne coatings), to separation of the coupling solvent from the water at a different temperature into two phases. This process is reversible.

Disclosed is an improved method to enhance oil recovery (EOR) optimizing the characteristics of coupling solvents in formulating compositions of injection streams in EOR applications, wherein the compositions are tailored for different reservoirs at different temperatures. The compositions are particularly suitable for challenging reservoirs, e.g., some reservoirs in Southeast Asia regions considered to have the highest temperature gradient due to their geological settings with temperature of 300° F. or higher, and sometimes 400° F. or higher. Thus, in some embodiments, the reservoir temperature is at least 150° F. Alternatively, in some embodiments, the reservoir temperature is in a range of 50° F. to 300° F. Nonetheless, the method allows for the recovery and re-use of the solvents for subsequent injection in EOR applications.

In one embodiment, the coupling solvent is selected such that at the preparation/injection temperature, the mixture is water miscible in the aqueous stream for injection into the reservoir. However, the mixture becomes oil miscible in the reservoir, i.e., the composition with the selected coupling solvent is hydrophilic below the reservoir temperature but hydrophobic and miscible in oil at a temperature at or above the reservoir temperature when the composition is in the reservoir. As the composition is recovered with hydrocarbons as produced water, the coupling solvent can be recycled and reused in injection streams. Of note, in some embodiments, a plurality of coupling solvents can be used. Moreover, in some embodiments, at least one coupling solvent and at least one co-solvent can be used. Furthermore, in some embodiments, at least one coupling solvent, at least one co-solvent, and at least one polymer can be used. Alternatively, in some embodiments, at least one coupling solvent and at least one polymer can be used.

Compositions with Coupling Solvent(s) for EOR Applications: In one embodiment to tailor compositions for a selected reservoir at certain characteristics, e.g., a high temperature reservoir, a coupling solvent is selected for its property, or coupling solvent mixture property of miscibility and immiscibility, i.e., its phase boundary characteristics ranging from ambient to a temperature within 10° C. of the reservoir selected for EOR application. The coupling solvent is selected such that for a composition having 2-25 wt. % concentration of a mixture of coupling solvent(s) and co-solvent(s), the composition is miscible at ambient temperature (injection temperature), but water immiscible at the reservoir operation temperature.

The composition comprising 2-25 wt. % of a solvent mixture can also be characterized as having a phase inversion temperature (PIT) that is within 10° C. (12.22° F.) of the reservoir operating temperature. In the reservoir, the solvent mixture becomes water immiscible but oil miscible (hydrophobic) as it heats at or above the reservoir temperature. Thus, the solvent mixture moves from being miscible in the injection water to being miscible in the reservoir oil, mobilizing the reservoir oil to increase oil recovery.

In one embodiment, the composition of brine/coupling solvent mixture has a miscibility temperature of at least 5-10° C. (6-12° F.) below the reservoir operation temperature and its phase inversion temperature (PIT) within −1 to 10° C. (1-12.22° F.) of the reservoir temperature. For example, if the reservoir temperature is 180° F. then the miscible temperature of brine/coupling solvent or coupling solvent mixture is 170-175° F. while the immiscible temperature should be between 179-190° F. The miscibility temperature can be lower than 10° F. (e.g., at less than 170° F.), but the immiscible temperature is at or near the reservoir temperature (e.g., great than 179° F.). The coupling solvent can be selected for a much higher immiscible inversion temperature above the reservoir operating temperature (e.g., PIT above 10° C. or 12.22° F. of the reservoir temperature), but the composition comprising the coupling solvent may not remain miscible in the field water to allow for recovery and recycle of the coupling solvent for subsequent EOR injections. Those of ordinary skill in the art may appreciate that the temperature differential for the coupling solvent may work in both directions, for example, the brine/coupling solvent mixture may become immiscible when going from a colder temperature (e.g., ambient temperature of 77° F.) to a hotter temperature (e.g., 76-200° F.) or going from a hotter temperature (e.g., 50° F.) to a colder temperature (e.g., 49-32° F.) depending on the coupling solvent (and/or other co-solvent(s) selected).

In yet another embodiment, the coupling solvent is selected such that when it is mixed with water and at least one co-solvent for an injection stream, a single phase is formed (composition is water miscible) at a temperature less than 130° F., and phase separation occurs over the range of 3-60 wt. % of organic solvent at a reservoir temperature of at least 200° F. (coupling solvent and co-solvent mixture is water immiscible but oil miscible).

Selected Coupling Solvent(s): In one embodiment, the coupling solvent selected is a coupling solvent typically used in the paint/coating industry, which optionally in combination with a co-solvent, e.g., another coupling solvent, an alcohol, or a surfactant, it increases the mutual solubility with water at the injection temperature, and thus helps mitigate formation plugging and improve performance when injected into a formation. The coupling solvent may be used alone, or in a mixture with other coupling solvents or organic compounds as a co-solvent. In one embodiment, the coupling solvent and optional co-solvent are present in a sufficient amount, e.g., from 2 to 30 wt. % of an injection stream, to maintain a single phase solvent/mixture for any ratio of water to solvent(s) at a temperature less than 130° F. The mixture of coupling solvent and a co-solvent is present in an injection stream in an amount of 4-20 wt. % in a second embodiment, and from 5-15 wt. % of an injection stream in a third embodiment.

In one embodiment, the selection of the coupling solvent is based on the coupling solvent (or mixtures thereof) property of miscibility & immiscibility, its phase boundary near the reservoir temperature for the intended reservoir for injection. In one embodiment, the coupling solvent is selected so that the field brine/solvent mixture to have a miscibility temperature of at least 5-10° C. (6-12° F.) below the reservoir temperature, and its inversion temperature (PIT) within −1 to 10° C. of the reservoir temperature. Phase equilibria or boundary diagrams are determined by plotting the phase observed (miscible or immiscible) on a water/solvent or solvent mixture vs. temperature grid. For example, the plot includes on the x-axis the field brine ranges from 100-0% with the solvent or solvent mixtures range from 0-100%. The y-axis is temperature from 70° F. to the desired reservoir temperature, e.g., 200° F.

In one embodiment, the coupling solvent is an oxygenated solvent that comprises ketones, esters, ethers, glycol ethers, glycol ether esters, or any combination thereof. In one embodiment, the coupling solvent is characterized as having a phase equilibria of a U or V shape, with a Lower Critical Solution Temperature of at least 77° F., and with a range of coupling solvent/water ratios over which immiscibility occurs (e.g., at a temperature of at least 200° F.) falling within a coupling solvent/water ratio of 2-80 vol. % of coupling solvent.

In one embodiment, the range coupling solvent/water volume percent ratio (2-80 vol. % in one embodiment, 2-70% in another embodiment, 2-60% in another embodiment, 2-50% in another embodiment, 2-40% in another embodiment, 2-30% in another embodiment, 2-20% in another embodiment, 2-15% in another embodiment, 10-20% in another embodiment, 5-10% in another embodiment, etc.) over which immiscibility occurs at a temperature of within −1 to 10° C. of the reservoir temperature. In one embodiment, the range coupling solvent/water volume percent ratio (2-80 vol. % in one embodiment, 2-70% in another embodiment, 2-60% in another embodiment, 2-50% in another embodiment, 2-40% in another embodiment, 2-30% in another embodiment, 2-20% in another embodiment, 2-15% in another embodiment, 10-20% in another embodiment, 5-10% in another embodiment, etc.) over which immiscibility occurs is at the reservoir temperature (e.g., -5 to 10° C. of the reservoir temperature).

In short, in one embodiment, the coupling solvent/water ratio is 2-80 vol. % of coupling solvent. In another embodiment, the coupling solvent/water ratio is 2-70 vol. % of coupling solvent. In another embodiment, the coupling solvent/water ratio is 2-60 vol. % of coupling solvent. In another embodiment, the coupling solvent/water ratio is 2-50 vol. % of coupling solvent. In another embodiment, the coupling solvent/water ratio is 2-40 vol. % of coupling solvent. In another embodiment, the coupling solvent/water ratio is 2-30 vol. % of coupling solvent. In another embodiment, the coupling solvent/water ratio is 2-20 vol. % of coupling solvent. In another embodiment, the coupling solvent/water ratio is 2-15 vol. % of coupling solvent. In another embodiment, the coupling solvent/water ratio is 10-20 vol. % of coupling solvent. In another embodiment, the coupling solvent/water ratio is 5-10 vol. % of coupling solvent. At least a portion of the oxygenated coupling solvent is water immiscible at the reservoir temperature and therefore miscible with the hydrocarbons at the reservoir temperature for driving the hydrocarbons toward a production well. In some embodiments, the water immiscibility occurs at a temperature within −5 to 10° C. of the reservoir temperature. In some embodiments, the coupling solvent mixture even begins to become immiscible during injection (e.g., as the coupling solvent mixture moves downhole and the reservoir temperature increases (and the coupling solvent of the mixture subsequently separates)). Of note, these embodiments are applicable when the coupling solvent mixture includes one or more co-solvents as well.

In one embodiment, the coupling solvent is an alkyl ether of mono and diethylene glycol, in which the alkyl group (which may be straight or branched) has 1-8 carbons, e.g. methyl, ethyl, propyl, butyl, hexyl, or octyl. Examples of glycol ethers comprise ethylene glycol pentyl ether (EGPE), ethylene glycol butyl ether (EGBE), ethylene glycol hexyl ether (EGHE), diethylene glycol butyl ether (DGBE), propylene glycol ethers including propylene glycol n-butyl ether, dipropylene glycol n-butyl ether, dipropylene glycol methyl ether acetate, tripropylene glycol methyl ether, propylene glycol monopropylether; commercially available coupling solvents such as DOWANOL™ PPh Glycol Ether or phenoxypropanol, Butyl CELLOSOLVE™ solvent or 2-butoxyethanol, methoxytriglycol, or any combination thereof. In one embodiment, the coupling solvent is ethylene glycol pentyl ether that contains at least about 90% by weight of ethylene glycol n-pentyl ether as disclosed in U.S. Pat. No. 6,242,517 B1, which is incorporated herein by reference in its entirety.

Optional Co-solvent: The coupling solvent can be used for injection in a waterflood operation by itself, or in one embodiment is used in conjunction with a co-solvent, e.g., a different coupling solvent or an organic chemical compound selected from ketones, esters, ethers, glycol ethers, glycol ether esters, lactams, cyclic ureas, alcohols, aromatic hydrocarbons, aliphatic hydrocarbons, nitroalkanes, unsaturated hydrocarbons, halocarbons, surfactants commonly used for EOR applications, or any combination thereof. In some embodiments, the optional co-solvent can be used for a CEOR (chemical enhance oil recovery) Composition, for example, for a CEOR applications or EOR applications.

The co-solvent is selected to raise or lower the Lower Critical Solution Temperature of the coupling solvent depending on the temperature of the reservoir, or vice versa, the coupling solvent is selected to raise or lower the Lower Critical Solution Temperature of the co-solvent. The amount of co-solvent to be added to the coupling solvent mixture can also be varied to raise or lower the Lower Critical Solution Temperature of the coupling solvent depending on the temperature of the reservoir, or to expand or contract the range of solvent/water ratios over which phase separation occurs of at least 10%.

In one embodiment, the co-solvent is less water soluble than the coupling solvent. In another embodiment, the co-solvent is added in an amount to raise the Lower Critical Solution Temperature of the coupling solvent of at least 10%. In a third embodiment, the co-solvent is added in a sufficient amount to contract the range of solvent/water ratios over which phase separation occurs of at least 10%.

The weight ratio of coupling solvent to co-solvent ranges from 1:20 to 20:1 in one embodiment, from 1:10 to 10:1 in a second embodiment, and from 1:5 to 5:1 in a third embodiment. In some embodiments with the use of surfactants as a co-solvent, as surfactants are relative expensive, a larger amount of coupling solvent can be used relative to surfactants to achieve the desired phase boundary results with a minimum amount of surfactants being present.

In one embodiment, the co-solvent is selected from the group of alkoxy ethoxyethanol compounds as disclosed in U.S. Pat. No. 5,753,738, which is incorporated herein by reference in its entirety. Examples include isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxyethoxyethanol ("MIBCDGE"), n-hexoxy ethoxyethanol (hereafter "n-HDGE"), 4-methylpentoxy ethoxyethanol ("4-MPDGE"), or any combination thereof. In another embodiment, the co-solvent comprises butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, or any combination thereof.

In one embodiment, the co-solvent for use with the coupling solvent is a surfactant commonly used in EOR applications, e.g., anionic surfactants, cationic surfactants, nonionic surfactants, amphoteric surfactants, or any combination thereof. Examples of surfactants include anionic surfactants disclosed for use in EOR applications such as alkyl aryl sulfonates (AAS), a-olefin sulfonates (AOS), internal olefin sulfonates (IOS), alcohol ether sulfates derived from propoxylated $Ci_2$-$C_{2o}$ alcohols, or any combination thereof; nonionic surfactant such as an ethoxylated alcohol or any combination of an alcohol and an ethoxylated alcohol (see U.S. Pat. Appl. Publ. No. 2009/0203557 incorporated herein by reference in its entirety); any combination of anionic and cationic surfactants; or any combination thereof. In one embodiment, the co-solvent comprises disulfonated surfactants, aromatic ether polysulfonates, or any combination thereof. In another embodiment, the co-solvent is a salt-tolerant anionic surfactant composition as disclosed in Patent Publication No. WO2014055158A1, which is incorporated herein by reference in its entirety. In yet another embodiment, the co-solvent is a surfactant comprising internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, or any combination thereof.

Optional Additives—Polymers for Polymer Flooding: In one embodiment, the coupling solvent is used for polymer flooding, combining with powder polymer, generating substantially anhydrous polymer compositions for EOR treatment. Examples of suitable powder polymers include biopolymers such as xanthan gum, scleroglucan, polysaccharides such as guar gum, or any combination thereof. Examples of suitable powder polymers include synthetic polymers such as partially hydrolyzed polyacrylamides (HPAMs or PHPAs), hydrophobically-modified associative polymers (APs), or any combination thereof. Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS) and N-vinyl pyrrolidone (NVP). The NVP-based synthetic may be single-, co-, or ter-polymers.

In one embodiment, the substantially anhydrous polymer composition comprises 20-80 wt. % of a powder polymer in a matrix of 80-20 wt. % the coupling solvent, and optionally other additives. In another embodiment, the substantially anhydrous polymer composition comprises 30-70 wt. % of a powder polymer in matrix of 70-30 wt. % coupling solvent, and optional other additives. In another embodiment, the weight ratio of coupling solvent to powder polymer ranges from 20:80 to 80:20. In yet another embodiment, the weight ratio of coupling solvent to powder polymer ranges from 40:60 to 60:40.

In some embodiments, a polymer may be practically any polymer that may be injected into a reservoir. A polymer in the form of a powder, gel, emulsion, or liquid, may be mixed (e.g., mixed on-site) with a solute such as water. Indeed, depending on the specific embodiment, the "polymer" may be a polymer composition, a polymer solution, a polymer suspension, polymer dispersion, a liquid polymer, etc. Thus, the "polymer" itself may be made up of various constituents. For example, a solvent in the form of a surfactant may be a constituent of the polymer. For example, the polymer may include various constituents such as water, mineral oil, one or more solvents, one or more optional additives, or any combination thereof. The polymer may include additional and/or alternative constituents as well.

For example, the polymer can be initially provided as a powder that is mixed on-site, or the polymer can be initially provided in a partial-strength solution, such as gel, emulsion, or other fluid that is made up partly of polymer (e.g., 2%-60% polymer) in a solute such as water as discussed hereinabove. The "polymer" may be a plurality of polymers in some embodiments. At least a portion of the polymer injected into the reservoir may be produced from the reservoir, and the produced polymer may be recycled and reused.

In some embodiments, a powder polymer may be selected or tailored according to the characteristics of the reservoir for EOR treatment such as permeability, temperature, and salinity. Examples of suitable powder polymers include biopolymers such as polysaccharides. Polysaccharides can be xanthan gum, scleroglucan, guar gum, schizophyllan, any derivative thereof (e.g., such as a modified chain), or any combination thereof. Examples of suitable powder synthetic polymers include polyacrylamides, partially hydrolyzed polyacrylamides (HPAMs or PHPAs), hydrophobically-modified associative polymers (APs), or any combination thereof. Also included are co-polymers of polyacrylamide (PAM) and one or both of 2-acrylamido 2-methylpropane sulfonic acid (and/or sodium salt) commonly referred to as AMPS (also more generally known as acrylamido tertiary-butyl sulfonic acid or ATBS), N-vinyl pyrrolidone (NVP), and the NVP-based synthetic may be single-, co-, or ter-polymers. In one embodiment, the powder synthetic polymer comprises polyacrylic acid (PAA). In one embodiment, the powder synthetic polymer comprises polyvinyl alcohol (PVA). Copolymers may be made of any combination or mixture above, for example, a combination of NVP and ATBS. Thus, examples of suitable powder polymers include biopolymers or synthetic polymers. Examples of suitable powder polymers can also include any mixture of these powder polymers (including any modifications of these powder polymers). Indeed, the terminology "mixtures thereof" or "combinations thereof" can even include "modifications thereof" herein.

In one embodiment, the powder polymer is an anionic polyacrylamide having a charge ranging from 0 to about 40%, which may be a result of the reaction to form polyacrylamide that generally starts with about 0% to about 40% acrylic acid or acid salt. The polymer that may be formed with acrylic acid or an acid salt monomer is called anionic polyacrylamide because the polymer itself contains a negative charge, which is balanced by a cation, usually sodium. A polymer made with little or no acid or acid salt is considered nonionic polyacrylamide because the polymer essentially contains no charge. The powder polymer has an average molecular weights (Mw) of: 0.5 to 30 Million Daltons in one embodiment; from 1 to 15 Million Daltons in a second embodiment; at least 2 Million Daltons in a third embodiment; from 4 to 25 Million Daltons in a fourth embodiment; less than or equal to 25 Million Daltons in a fifth embodiment; and at least 0.5 Million Daltons in a sixth embodiment.

In some embodiments, the polymer powders have an average particle size of at least 5 mesh in one embodiment, 10-100 mesh in a second embodiment, and 40-400 mesh in a third embodiment. The polymer powder undergoes an additional milling, grinding, or crushing prior to mixing with the water soluble solvent in the preparation, for a particle size of 1-1000 μm in one embodiment; from 10-500 μm in a second embodiment; at least 5 μm in a third embodiment; and from 20-500 μm in a fourth embodiment.

CEOR Applications/EOR Applications: The coupling solvent(s) and co-solvent(s) are mixed with water in an aqueous formulation for injecting into reservoirs to recover additional oil in a waterflood process. The water medium may be fresh water, tap water, river water, sea water, produced water, formation water, or any combination thereof having certain characteristics including salinity and pH. In one embodiment, the water medium is produced water or formation water, which contains coupling solvent(s) and co-solvent(s) previously injected and recovered from the reservoir.

The aqueous stream containing the coupling solvent(s) and co-solvent(s) mixture is injected into the reservoir at a temperature where the mixture is water miscible. After injection as the injection fluid temperature achieves the reservoir temperature, the mixture is no longer miscible but immiscible. The coupling solvent(s) separate from the water. The coupling solvent(s) is organic soluble and moves into the remaining oil phase in the formation, preventing formation plugging and follows field brine flow. Either by oil surface tension or viscosity reduction of penetrated oil in place, the oil is mobilized by waterflooding.

In embodiments with the use of the coupling solvent for a miscible water/solvent injection mixture (at the surface) and a miscible hydrocarbon/solvent phase in the reservoir, it is expected that for a 2-25% solvent concentration, at least 30% additional oil recovery is achieved. In a second embodiment, at least 40% additional oil recovery is expected. In a third embodiment, at least 50% additional oil recovery is expected. After oil recovery, the solvent mixture migrates to the production well and at least a portion is recovered as produced water. As the oil temperature cools below the solvent immiscible temperature, the recovered produced water is miscible with the coupling solvent and sent back to field water for reinjection.

In one embodiment, no fluid separation equipment is needed to recover the solvent or solvent mixture, as the reservoir temperature controls the phase miscibility of the solvent/solvent mixture. In the oil water separation process to treat the produced water, when the oil is cooled below the immiscible phase boundary, the solvent or solvent mixture will remain with recovered water phase for reinjection in the oil recovery process. In one embodiment, at least 90% of the solvent or solvent mixture will remain with recovered water phase which can be reinjected in the oil recovery process. As no additional equipment is required to recover the solvent or solvents, operating cost is minimized as solvent water recycling further lowers initial solvent material costs.

Figures: References will be made to the Figures, showing embodiments of the invention. In one embodiment, the coupling solvent is selected in the appropriate amount for a particular reservoir based on a phase diagram as illustrated in FIG. 1, showing the changes in water solubility with increasing temperature. In the illustrated example of FIG. 1, a mixture of 80/20 (volume percent) concentration of coupling solvent X (propylene glycol propyl ether) in water is miscible with water at room temperature. However, coupling solvent X becomes immiscible with water when heated to a temperature of about 135° F. (as exhibited by mixture separation of two distinct layers). Also as illustrated, the temperature at which immiscibility first occurs is a function of the coupling solvent X/water volume percent ratio. The minimum point of the miscibility boundary curve determines the lower critical solution temperature, i.e., 89° F., and occurs at a specific coupling solvent/water volume percent ratio.

Figure 2:
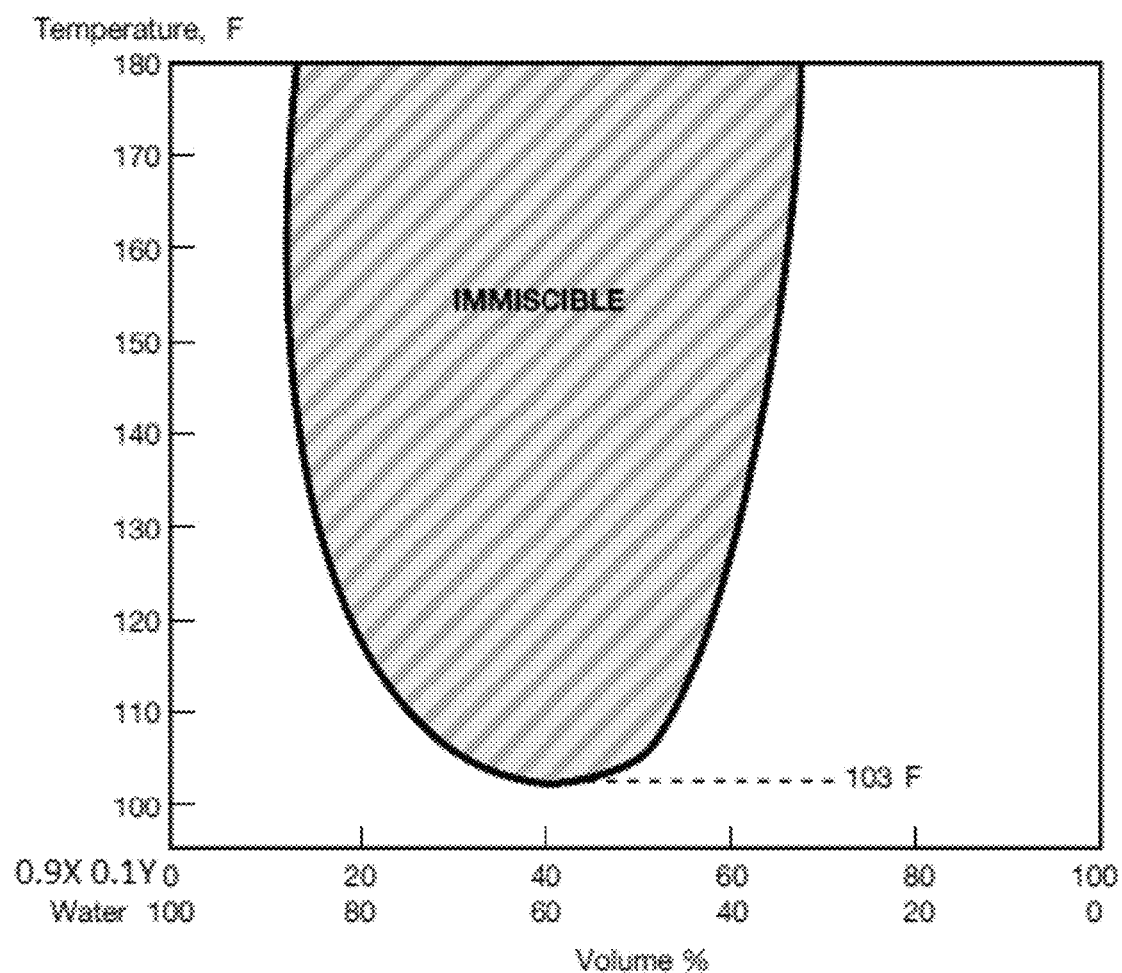
FIG. 2 is an illustrative phase diagram showing the phase equilibria of a mixture of the coupling solvent in FIG. 1 plus a co-solvent Y (at a Y:X ratio of 1:9) as a function of temperature and concentration in water.

In the next step after the construction (or obtaining) a phase diagram as a function of temperature/concentration, selected co-solvent(s) or other coupling agent(s) can be added to the coupling solvent/water mixture to shift the phase boundaries to customize the injection stream concentration and composition for a specific reservoir temperature. As illustrated in FIG. 2, a co-solvent Y (n-butyl alcohol) with limited solubility in water is used. The addition of a co-solvent Y to replace 10 vol. % of the coupling solvent X, the phase separation occurs at a lower temperature than when the coupling solvent X is used alone in the solvent/water system; that is, immiscibility of the system increases with the incorporation of the co-solvent Y. The range of (total) solvent/water ratios over which immiscibility occurs at elevated temperature in the example is about the same. Also as shown, with the addition of co-solvent Y, the lowest temperature at which immiscibility occurs increases to 103° F. compared to the composition with just the coupling solvent X. At a reservoir temperature of 170° F., phase separation occurs at a range of about 18-63% organic solvent.

Figure 3:
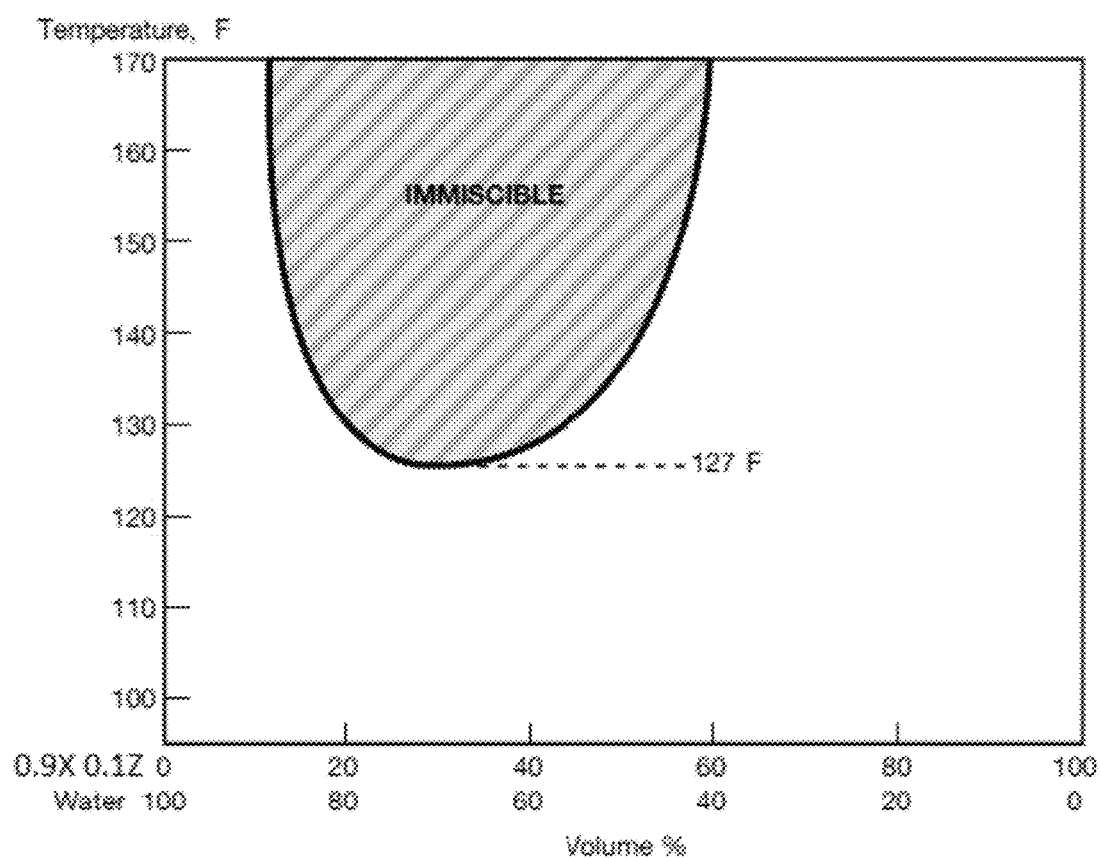
FIG. 3 is an illustrative phase diagram showing the phase equilibria of a mixture of the coupling solvent in FIG. 1 plus a different co-solvent Z (at a Z:X volume ratio of 1:9) as a function of temperature and concentration in water.

FIG. 3 illustrates an embodiment, wherein a different co-solvent Z (t-butyl alcohol) is added to replace 10 vol. % of the coupling solvent X. At a reservoir temperature of 170° F., phase separation occurs at a somewhat similar range of about 15-58% organic solvent. However, the lowest temperature at which immiscibility occurs now increases to 127° F.

Figure 4:
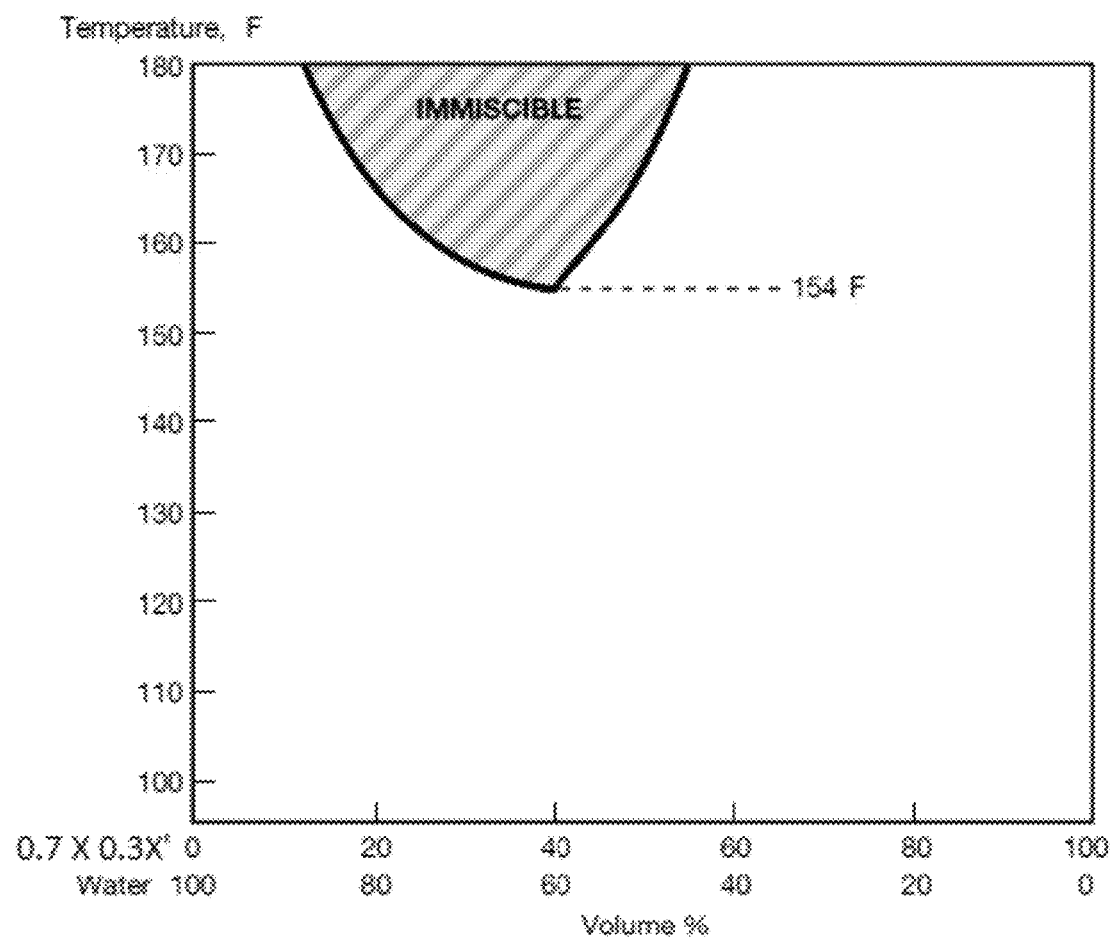
FIG. 4 is an illustrative phase diagram showing the phase equilibria of a mixture of the coupling solvent in FIG. 1 plus a different coupling solvent X' (ratio of 0.3X':0.7X) as a function of temperature and concentration in water.

FIG. 4 illustrates yet another embodiment with a mixture of 2 different coupling solvents, with coupling solvent X' (butyl ether of diethylene glycol) replacing 30% of coupling solvent X, it is noted that the minimum temperature at which separation occurs is 154° F. For a reservoir temperature of 170° F., phase separation occurs over a range of 12-55% organic solvent. This compares to a phase separation range of 17-78% organic solvent for coupling solvent X (in FIG. 1).

Figure 5:
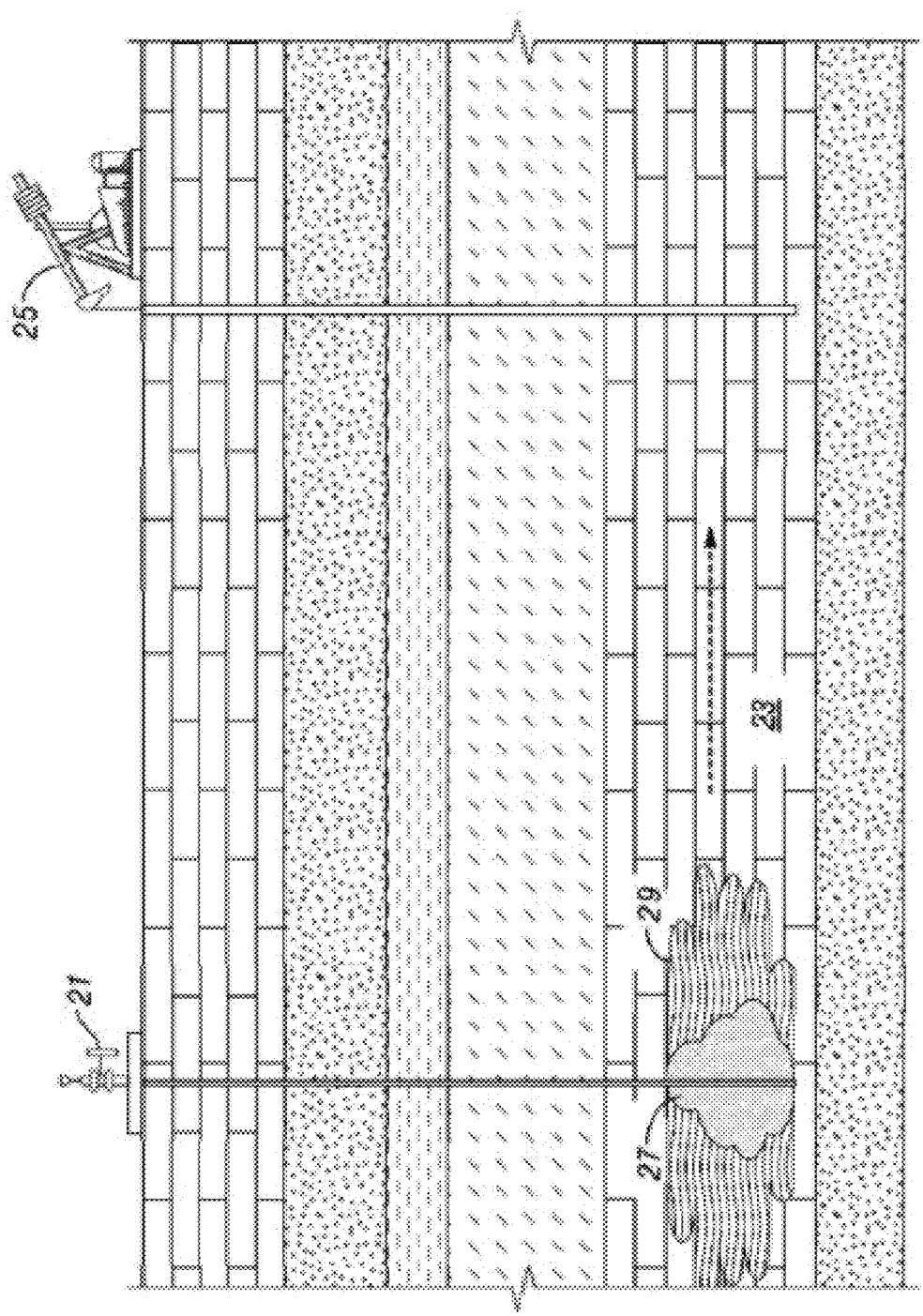
FIG. 5 is a schematic sectional view of a reservoir that is in fluid communication with an injection well and a production well in operation after injection of a composition containing the solvents in accordance with one embodiment of the invention.

FIG. 5 illustrates an embodiment of an enhanced oil recovery operation with an injection stream 27 comprising a coupling solvent. The injection fluid is injected through injection well 21 into reservoir 23, wherein the coupling solvent/co-solvent mixture is miscible in the aqueous stream. The injection fluid 27 disperses through reservoir 23, wherein at the reservoir temperature, the coupling solvent/co-solvent mixture becomes immiscible as it heats at or above the reservoir temperature as a portion of the injection fluid proceeds toward production well 25 as flood front 29. Hydrocarbons and at least a portion of the coupling solvent/co-solvent mixture and injection fluid are recovered from the production well 25 as produced water.

EXAMPLES

The following examples are given to illustrate the present invention. However, the invention is not limited to the specific conditions or details described in these examples.

Example 1

Core material consisting of Bentheimer rock one foot long and 2 inch in diameter with pore volume ranging from 102.26 cc to 143.32 cc., and a permeability of 2.1 mD to 3.1 mD, was provided. The core was saturated with oil from a field in South Asia. The core flood experiments were conducted with propylene glycol propyl ether as the coupling solvent after waterflooding to residual oil saturation (range 38.3% to 44.7%). Four core flood results are listed in Table 1, two with 5% EP at 185° F. and 203° F. and two with 10% EP at 185° F. and 203° F. Oil recovery for 5% EP at 189° F. was 3% oil recovery compared to 20% at 203° F. The core flood for 10% EP at 189° F. was 29% oil recovery with an improved recovery of 55% at 203° F. An improvement in oil recovery occurred with solvent addition to the waterflood, and a corresponding increase in oil recovery when the solvent became immiscible in water at 203° F.

The results in Table 1 indicate that addition of the coupling solvent results in additional oil recovered from the core when the coupling solvent became immiscible with the flood water. The immiscible coupling solvent will mix with the residual oil changing viscosity and surface tension of the residual oil.

TABLE 1

| Temperature ° F. | Miscible/Immiscible with Water | Concentration % | Cummulative Oil |
|---|---|---|---|
| 185 | Miscible | 5 | 3 |
| 203 | Immiscible | 5 | 20 |
| 185 | Miscible | 10 | 29 |
| 203 | Immiscible | 10 | 55 |

Those of ordinary skill in the art will appreciate that various modifications may be made to the embodiments discussed herein. In one embodiment, a method to recover hydrocarbons from a reservoir, where the reservoir has a reservoir temperature, includes providing an oxygenated coupling solvent. The oxygenated coupling solvent is characterized as having water immiscibility at the reservoir temperature. The method includes providing a water for injecting into the reservoir, forming an aqueous mixture of the water and the oxygenated coupling solvent, and injecting the aqueous mixture into the reservoir to displace the hydrocarbons with the aqueous mixture. At least a portion of the oxygenated coupling solvent is water immiscible at the reservoir temperature and therefore miscible with the hydrocarbons at the reservoir temperature for driving the hydrocarbons toward a production well. The method includes recovering produced water from the production well, where the produced water contains the displaced hydrocarbons and at least a portion of the injected aqueous mixture. The method includes separating the recovered produced water at a temperature that is below the reservoir temperature, where at least a portion of the oxygenated coupling solvent in the recovered produced water remains water miscible in the recovered produced water for subsequent injection into a reservoir. In one embodiment, the oxygenated coupling solvent comprises ketones, esters, ethers, glycol ethers, glycol ether esters, or any combination thereof.

In one embodiment, the oxygenated coupling solvent has a Lower Critical Solution Temperature of at least 77° F. In one embodiment, the water immiscibility occurs at a temperature within -5 to 10° C. of the reservoir temperature. In one embodiment, the reservoir temperature is in a range of 50° F. to 300° F. In one embodiment, the reservoir temperature is at least 150° F. In one embodiment, the oxygenated coupling solvent/water ratio in the aqueous mixture is 2-50 vol. % of oxygenated coupling solvent. In one embodiment, the recovered produced water is separated at a temperature of at least 5° C. below the reservoir temperature. In one embodiment, at least 90% of the oxygenated coupling solvent in the recovered produced water remains water miscible for subsequent injection.

One embodiment may include adding a sufficient amount of a co-solvent for mixing into the aqueous mixture (that contains the oxygenated coupling solvent), where the co-solvent is selected for the aqueous mixture to be water immiscible at the reservoir temperature and therefore miscible with the hydrocarbons at the reservoir temperature. In one embodiment, the co-solvent comprises ketones, esters, ethers, glycol ethers, glycol ether esters, lactams, cyclic ureas, alcohols, aromatic hydrocarbons, aliphatic hydrocarbons, nitroalkanes, unsaturated hydrocarbons, halocarbons, surfactants commonly used for enhanced oil recovery applications, or any combination thereof. In one embodiment, the co-solvent is provided in a weight ratio of the oxygenated coupling solvent to the co-solvent ranging from 1:20 to 20:1. In one embodiment, the co-solvent for mixing into the aqueous mixture comprises an anionic surfactant, a cationic surfactant, a nonionic surfactant, an amphoteric surfactant, or any combination thereof. In one embodiment, the co-solvent for mixing into the aqueous mixture comprises alkyl aryl sulfonates (AAS), a-olefin sulfonates (AOS), internal olefin sulfonates (IOS), alcohol ether sulfates derived from propoxylated $C_{i2}$-$C_{2o}$ alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, or any combination thereof. In one embodiment, the co-solvent for mixing into the aqueous mixture comprises alkoxy ethoxyethanol compounds. One embodiment may include adding a sufficient amount of a polymer for mixing into the aqueous mixture (that contains the oxygenated coupling solvent and the co-solvent).

One embodiment may include adding a sufficient amount of a polymer for mixing into the aqueous mixture (that contains the oxygenated coupling solvent). In one embodiment, the polymer comprises a biopolymer, a synthetic polymer, a co-polymer, or any combination thereof. In one embodiment, the polymer is a powder polymer, and where a weight ratio of the coupling solvent to the powder polymer ranges from 20:80 to 80:20.

Furthermore, in one embodiment, a method for selecting additive solvents for use in recovering hydrocarbons in a waterflooding operation comprises obtaining characteristics of a reservoir, including the reservoir temperature. The method includes obtaining characteristics of a brine from the reservoir including salinity, pH, and polar organic solvent contents. The method includes identifying a oxygenated coupling solvent and using a first phase equilibria diagram of phases observed from an aqueous mixture of brine and the identified oxygenated coupling solvent. The method includes identifying a co-solvent for mixing into the aqueous mixture and using a second phase equilibria diagram of phases observed from an aqueous mixture of brine, the identified oxygenated coupling solvent, and the identified co-solvent. The method includes forming an injection stream with the identified oxygenated coupling solvent and the identified co-solvent for injection into the reservoir at a desired concentration of oxygenated coupling solvent and co-solvent mixture. The method includes injecting the injection stream into the reservoir to displace hydrocarbons in the reservoir, where at least a portion of the oxygenated coupling solvent is water immiscible at the reservoir temperature and therefore miscible with the hydrocarbons at the reservoir temperature for driving the hydrocarbons toward a production well.

In one embodiment, the first phase equilibria diagram is constructed as a function of brine/oxygenated coupling solvent mixture ranging from 100-0% brine/oxygenated coupling solvent volume ratio to 0-100% brine/oxygenated coupling solvent volume ratio %, and as a function of temperature ranging from ambient to the reservoir temperature. In one embodiment the second phase equilibria diagram is constructed as a function of brine/oxygenated coupling solvent/co-solvent mixture ranging from 100-0% brine/oxygenated coupling solvent/co-solvent volume ratio to 0-100% brine/oxygenated coupling solvent/co-solvent volume ratio %, and as a function of temperature ranging from ambient to the reservoir temperature. Furthermore, although the figures show miscibility and immiscibility up to certain temperatures, it is believed that the regions continue to extend beyond those temperatures, e.g., up to reservoir temperatures (e.g., 400° F.).

In one embodiment, the oxygenated coupling solvent comprises ketones, esters, ethers, glycol ethers, glycol ether esters, or any combination thereof. In one embodiment, the co-solvent comprises an anionic surfactant, a cationic surfactant, a nonionic surfactant, an amphoteric surfactant, or any combination thereof. In one embodiment, the co-solvent is provided in a weight ratio of the oxygenated coupling solvent to the co-solvent ranging from 1:20 to 20:1. One embodiment may include adding a sufficient amount of a polymer for mixing into the injection stream. In one embodiment, the reservoir temperature is in a range of 50° F. to 300° F.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. This term "about" generally refers to a range of numbers that one of ordinary skill in the art would consider as a reasonable amount of deviation to the recited numeric values (i.e., having the equivalent function or result). For example, this term "about" can be construed as including a deviation of ±10 percent of the given numeric value provided such a deviation does not alter the end function or result of the value. Therefore, a value of about 1% can be construed to be a range from 0.9% to 1.1%.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Unless otherwise defined, all terms, including technical and scientific terms used in the description, have the same meaning as commonly understood by one of ordinary skill in the art to which this invention belongs.

While various embodiments are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

Furthermore, as used herein, the use of the terms "a" or "an" when used in conjunction with an element may mean "one," but it is also consistent with the meaning of "one or more," "at least one," and "one or more than one." Thus, it is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the use of "may" or "may be" indicates that a modified term is appropriate, capable, or suitable for an indicated capacity, function, or usage, while taking into account that in some circumstances the modified term may sometimes not be appropriate, capable, or suitable. Furthermore, unless explicitly dictated by the language, the term "and" may be interpreted as "or" in some instances.

It is understood that when combinations, subsets, groups, etc. of elements are disclosed (e.g., combinations of components in an item, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Unless defined otherwise, all technical and scientific terms used herein have the same meanings as commonly understood by one of skill in the art to which the disclosed invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference. It is to be expressly understood, however, that each of the figures is provided for the purpose of illustration and description only and is not intended as a definition of the limits of the present invention.

The invention claimed is:

1. A method to recover hydrocarbons from a reservoir, the method comprising:
    forming an injection stream comprising a brine, a coupling solvent, and a co-solvent or a second coupling solvent for injection into the reservoir, the injection stream having a phase inversion temperature that is greater than a temperature of the injection stream prior to injection into the reservoir and that is less than a reservoir temperature such that the coupling solvent and the co-solvent or the second coupling solvent form a miscible mixture in a single phase with the brine prior to injection into the reservoir, wherein:
        the co-solvent or the second coupling solvent are different from the coupling solvent such that if the coupling solvent comprises ethers, glycol ethers, glycol ether esters, or any combination thereof, then the co-solvent or the second coupling solvent comprise ketones, esters, lactams, cyclic ureas, alcohols, aromatic hydrocarbons, aliphatic hydrocarbons, nitroalkanes, halocarbons, alkoxy ethoxyethanol compounds, anionic surfactants, cationic surfactants, nonionic surfactants, amphoteric surfactants, or any combination thereof; and
    injecting the injection stream into the reservoir, wherein at least a portion of the coupling solvent separates from the brine as the temperature of the injection stream increases to the reservoir temperature and achieves the phase inversion temperature of the injection stream, and the at least the portion of the coupling solvent becomes miscible with hydrocarbons in the reservoir to displace the hydrocarbons toward a production well.

2. The method of claim 1, wherein a concentration of the coupling solvent is determined such that the phase inversion temperature of the injection stream is modified to within 10° C. of the reservoir temperature prior to injection into the reservoir.

3. The method of claim 1, wherein the coupling solvent increases a mutual solubility with the brine at the temperature of the injection stream prior to injection into the reservoir.

4. The method of claim 1, wherein the coupling solvent includes at least one oxygen atom.

5. The method of claim 1, wherein the coupling solvent comprises ketones, esters, or any combination thereof, and wherein the co-solvent or the second coupling solvent comprise ketones, esters, ethers, glycol ethers, glycol ether esters, lactams, cyclic ureas, alcohols, aromatic hydrocarbons, aliphatic hydrocarbons, nitroalkanes, halocarbons, alkoxy ethoxyethanol compounds, anionic surfactants, cationic surfactants, nonionic surfactants, amphoteric surfactants, or any combination thereof.

6. The method of claim 1, wherein the coupling solvent comprises an alkyl ether of mono and di ethylene glycol where the alkyl group comprises one to eight carbon atoms.

7. The method of claim 1, wherein the injection stream comprises a concentration having 2-25 wt. % of the coupling solvent.

8. The method of claim 1, wherein the co-solvent or the second coupling solvent modifies the phase inversion temperature of the injection stream.

9. The method of claim 8, wherein the co-solvent or the second coupling solvent modifies the phase inversion temperature of the injection stream to within 10° C. of the reservoir temperature prior to injection into the reservoir.

10. The method of claim 8, wherein the co-solvent or the second coupling solvent modifies the range of coupling solvent to brine ratios where phase separation occurs by at least 10%.

11. The method of claim 8, wherein the co-solvent or the second coupling solvent is provided in a weight ratio of the coupling solvent to the co-solvent or the second coupling solvent ranging from 1:20 to 20:1.

12. The method of claim 8, wherein the coupling solvent has a phase equilibria defining phase boundaries and the co-solvent or the second coupling solvent shifts the phase boundaries of the phase equilibria to customize the injection stream for the reservoir temperature.

13. The method of claim 1, further comprising recovering at least a portion of the coupling solvent from the brine and the displaced hydrocarbons produced from the production well.

14. The method of claim 1, wherein the injection stream further comprises a polymer.

15. A method to recover hydrocarbons from a reservoir, the method comprising:
    forming an injection stream comprising a brine, a coupling solvent, and a co-solvent or a second coupling solvent for injection into the reservoir, wherein concentrations of the coupling solvent and the co-solvent or the second coupling solvent are determined such that the coupling solvent and the co-solvent or the second coupling solvent form a miscible mixture in a single phase with the brine prior to injection into the reservoir, wherein:

the coupling solvent comprises ketones, esters, ethers, glycol ethers, glycol ether esters, or any combination thereof; and the co-solvent or the second coupling solvent comprise ketones, esters, ethers, glycol ethers, glycol ether esters, lactams, cyclic ureas, alcohols, aromatic hydrocarbons, aliphatic hydrocarbons, nitroalkanes, halocarbons, alkoxy ethoxyethanol compounds, anionic surfactants, cationic surfactants, nonionic surfactants, amphoteric surfactants, or any combination thereof; and the co-solvent or the second coupling solvent are different from the coupling solvent such that if the coupling solvent comprises ethers, glycol ethers, glycol ether esters, or any combination thereof, then the co-solvent or the second coupling solvent comprise ketones, esters, lactams, cyclic ureas, alcohols, aromatic hydrocarbons, aliphatic hydrocarbons, nitroalkanes, halocarbons, alkoxy ethoxyethanol compounds, anionic surfactants, cationic surfactants, nonionic surfactants, amphoteric surfactants, or any combination thereof; and injecting the injection stream into the reservoir, wherein at least a portion of the coupling solvent separates from the brine as a temperature of the injection stream increases to a reservoir temperature and achieves a phase inversion temperature of the injection stream, and the at least the portion of the coupling solvent becomes miscible with hydrocarbons in the reservoir to displace the hydrocarbons toward a production well.

16. The method of claim 15, wherein the co-solvent or the second coupling solvent is added at a sufficient concentration to modify the phase inversion temperature of the injection stream to within 10° C. of the reservoir temperature prior to injection into the reservoir.

17. The method of claim 15, wherein the co-solvent or the second coupling solvent modifies the range of coupling solvent to brine ratios where phase separation occurs by at least 10%.

18. The method of claim 15, wherein the injection stream comprises a concentration having 2-25 wt. % of the coupling solvent.

19. The method of claim 15, wherein the co-solvent or the second coupling solvent is provided in a weight ratio of the coupling solvent to the co-solvent or the second coupling solvent ranging from 1:20 to 20:1.

20. The method of claim 15, wherein the coupling solvent has a phase equilibria defining phase boundaries and the co-solvent or the second coupling solvent shifts the phase boundaries of the phase equilibria to customize the injection stream for the reservoir temperature.

* * * * *